(12) United States Patent
Kim

(10) Patent No.: US 10,000,181 B2
(45) Date of Patent: Jun. 19, 2018

(54) PRETENSIONER AND SAFETY BELT ASSEMBLY INCLUDING THE SAME

(71) Applicant: HYUNDAI MOTOR COMPANY, Seoul (KR)

(72) Inventor: Eungjoo Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 61 days.

(21) Appl. No.: 15/366,439

(22) Filed: Dec. 1, 2016

(65) Prior Publication Data
US 2018/0105134 A1    Apr. 19, 2018

(30) Foreign Application Priority Data

Oct. 13, 2016 (KR) .................. 10-2016-0132781

(51) Int. Cl.
*B60R 22/195* (2006.01)

(52) U.S. Cl.
CPC ...... *B60R 22/1952* (2013.01); *B60R 22/1955* (2013.01)

(58) Field of Classification Search
CPC ................ B60R 22/1952; B60R 22/1955
See application file for complete search history.

(56) References Cited

U.S. PATENT DOCUMENTS

| | | | | |
|---|---|---|---|---|
| 6,113,145 A * | 9/2000 | Evans | ........... | B60R 22/1952 280/806 |
| 6,145,881 A * | 11/2000 | Miller, III | ........... | B60R 22/1951 280/801.2 |
| 6,238,003 B1 * | 5/2001 | Miller, III | ........... | B60R 22/1951 297/480 |
| 8,210,569 B2 | 7/2012 | Eberle et al. | | |
| 2006/0279077 A1 * | 12/2006 | Nakano | ........... | B60R 22/1952 280/806 |
| 2010/0052302 A1 * | 3/2010 | Bok | ........... | B60R 22/1952 280/806 |
| 2011/0068614 A1 * | 3/2011 | Sugiyama | ........... | B60R 22/1952 297/480 |
| 2015/0158590 A1 * | 6/2015 | Gehret | ........... | B64D 11/062 297/474 |

FOREIGN PATENT DOCUMENTS

| | | |
|---|---|---|
| JP | 2009-208616 A | 9/2009 |
| KR | 10-0936315 B1 | 1/2010 |
| KR | 10-0968829 B1 | 7/2010 |

\* cited by examiner

*Primary Examiner* — Darlene P Condra
(74) *Attorney, Agent, or Firm* — Knobbe Martens Olson & Bear LLP

(57) ABSTRACT

Disclosed are a pretensioner and a safety belt assembly including the same. The pretensioner includes an internal cylinder movably installed within an external cylinder with an outer surface thereof in contact with an inner surface of the external cylinder, a piston installed in the internal cylinder, a retracting member configured with one side connected to the piston and the other side configured to extend from the external cylinder and connected to a belt fastening a passenger, a gas generator configured to supply gas to the inside of the external cylinder to move the piston in a direction of pulling the retracting member, and a one-way restriction device configured to allow the piston to move with respect to the internal cylinder when the piston moves in the direction of pulling the retracting member and to restrict the piston to be within the internal cylinder when the piston moves in reverse direction.

11 Claims, 12 Drawing Sheets

PRETENSIONER AND SAFETY BELT ASSEMBLY INCLUDING THE SAME

CROSS-REFERENCE TO RELATED APPLICATION

This application claims the benefit of Korean Patent Application No. 10-2016-0132781, filed on Oct. 13, 2016 in the Korean Intellectual Property Office, the disclosure of which is incorporated herein by reference.

BACKGROUND

1. Field

Embodiments of the present disclosure relate to a seatbelt pretensioner.

2. Description of the Related Art

A safety belt assembly is an apparatus configured to fasten a passenger to a seat in a vehicle to protect the passenger from a shock or an accident which occurs while driving.

The safety belt includes a belt called webbing, a retractor mounted on a vehicle that rolls or unrolls one end of the belt, a fixing anchor for fixing the other end of the belt to the vehicle, and a tongue plate fastened to a buckle provided opposite the fixing anchor while being movably held at a middle part of the belt.

Also, a pretensioner configured to apply tension to the belt by instantaneously pulling the belt at the beginning of a car crash to reduce slack of the belt may be included. The pretensioner may be a type that is integrated with the retractor or a type that is installed at the fixing anchor or an anchor of the buckle to pull the belt or the buckle.

The disclosure of this section is to provide background of the invention. Applicant notes that this section may contain information available before this application. However, by providing this section, Applicant does not admit that any information contained in this section constitutes prior art.

SUMMARY

It is an aspect of the present disclosure to provide a pretensioner also functioning as a load limiter for maintaining tension applied to a belt at or below a load limit and a safety belt assembly including the same.

Additional aspects of the present disclosure will be set forth in part in the description which follows and, in part, will be obvious from the description, or may be learned by practice of the present disclosure.

One aspect of the present disclosure provides a pretensioner including an external cylinder, an internal cylinder movably installed in the external cylinder while being in close contact with an inner surface of the external cylinder, a piston installed in the internal cylinder, a retracting member configured to be with one side connected to the piston and the other side configured to extend from the external cylinder and be connected to a belt fastening a passenger, a gas generator configured to supply gas to the inside of the external cylinder to move the piston in a direction of pulling the retracting member, and a one-way restriction device configured to allow the piston to move with respect to the internal cylinder when the piston moves in the direction of pulling the retracting member and to restrict the piston to be within the internal cylinder when the piston moves in revere direction.

Frictional force between the outer surface of the internal cylinder and the inner surface of the external cylinder may be set to be at or below a load limit of the belt.

The retracting member may be in a bendable rope shape.

The pretensioner may further include an inlet provided at one end portion of the external cylinder to allow the retracting member to move in and out therethrough, a guiding roller installed at the inlet and configured to guide inward movement and outward movement of the retracting member, and an intermediate roller installed in the external cylinder opposite the inlet. Here, the retracting member may move into the external cylinder, pass through the piston, extend toward the intermediate roller, change direction by being wound around the intermediate roller, and be connected to the piston.

The gas generator may be installed at an end portion of the external cylinder opposite the inlet and generate gas to pressurize the piston toward the inlet.

The external cylinder may include a holding step having an inner surface adjacent to the inlet, at which one end portion of the internal cylinder is held, and the internal cylinder may have a length shorter than the length between the holding step and the intermediate roller and initially maintain a state having moved toward the inlet.

An initial position of the piston may be inside the end portion of the internal cylinder adjacent to the intermediate roller.

The retracting member may move in and out through an inlet provided at one end of the external cylinder, and the gas generator may be installed at the inlet of the external cylinder.

The internal cylinder may be provided to have a length shorter than the length of the external cylinder and maintains a state of having moved toward the end portion of the external cylinder, and the piston may be initially disposed inside an end portion of the internal cylinder adjacent to the inlet.

The one-way restriction device may include one or more slanted grooves formed at an outer surface of the piston facing an inner surface of the internal cylinder and having a depth configured to gradually become shallower as getting moved in a direction in which the piston moves and a restricting member accommodated in each of the one or more slanted grooves.

Another aspect of the present disclosure provides a safety belt assembly including a pretensioner that includes an external cylinder, an internal cylinder movably installed in the external cylinder with an outer surface thereof in close contact with an inner surface of the external cylinder, a piston installed in the internal cylinder, a retracting member configured to be with one side connected to the piston and the other side configured to extend from the external cylinder and be connected to a belt fastening a passenger, a gas generator configured to supply gas to the inside of the external cylinder to move the piston in a direction of pulling the retracting member, and a one-way restriction device configured to allow the piston to move with respect to the internal cylinder when the piston moves in the direction of pulling the retracting member and to restrict the piston to be within the internal cylinder when the piston moves in reverse direction.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
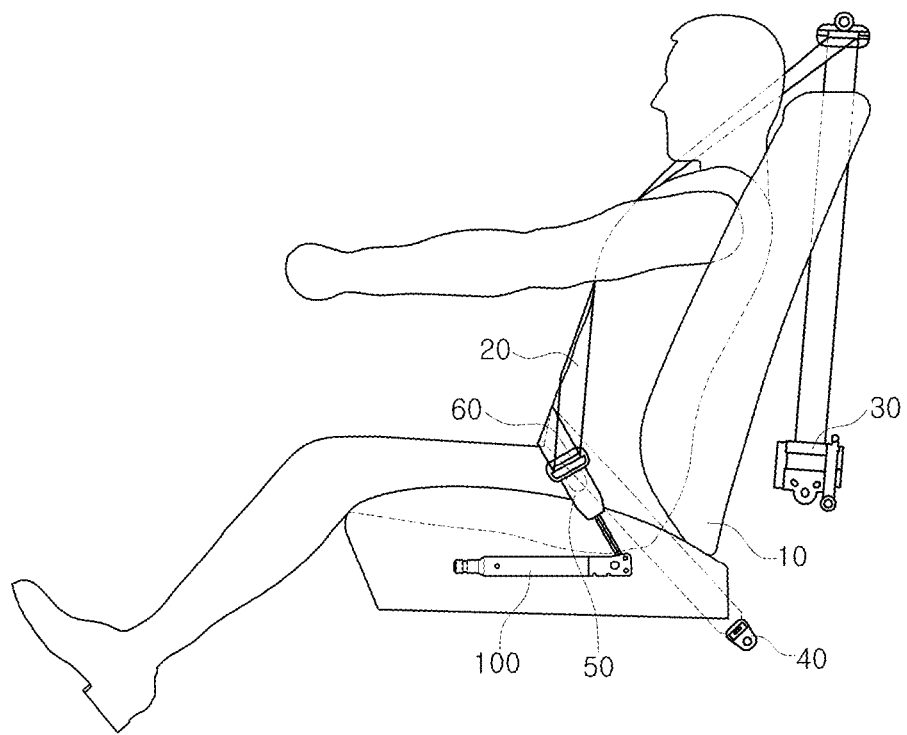
FIGS. 1 and 2 illustrate a safety belt assembly to which a pretensioner according to a first embodiment is applied.

Reference will now be made in detail to the embodiments of the present disclosure, examples of which are illustrated in the accompanying drawings, wherein like reference numerals refer to like elements throughout.

Hereinafter, embodiments of the present disclosure will be described in detail with reference to the attached drawings. The following embodiments are provided to completely transfer the concept of the present disclosure to one of ordinary skill in the art but not limited thereto and may be embodied in other forms. Throughout the drawings, parts which make the present disclosure unclear may be omitted and sizes of components may be slightly exaggerated for understanding.

A load-limiting pretensioner 100 for a safety belt assembly is provided. The pretensioner 100 is configured to pretension the safety belt assembly prior to, for example, an impending impact of the vehicle. Further, the pretensioner 100 is configured to limit the load or tension of the safety belt assembly which prevents excessive seat belt tension such that injury to the passenger wearing the safety belt assembly is inhibited or prevented.

The pretensioner 100 comprises an outer or external cylinder 110, an inner or internal cylinder 120, a piston 130, a wire or retracting member 140 and a gas generator 150. The internal cylinder 120 is positioned within the external cylinder 110 and configured to move telescopically relative to the external cylinder 110. The external cylinder 110 and the internal cylinder 120 may be configured such that the internal cylinder 120 is movable within a predetermined range relative to the external cylinder 110. That is, the external cylinder 110 is configured to limit movement of the internal cylinder 120 in a first direction relative to the external cylinder 110 and also configured to limit movement in a second direction relative to the external cylinder 110, the second direction being opposite to the first direction.

In some embodiments, an outer surface of the internal cylinder 120 is slidably movable against an interior surface of the external cylinder 110. The piston 130 is positioned within the internal cylinder 120 and configured to move axially within the internal cylinder 120. In some embodiments, an outer surface of the piston 130 is slidably movable against an interior surface of the internal cylinder 120. The retracting member 140 is attached to the piston 130 at a first end and attached to a safety belt assembly at a second end that is opposite the first end. In some configurations, the second end may be attached to a seat belt buckle 50 or an end portion 22 of a seat belt 20. Accordingly, movement of the piston 130 relative to the external cylinder 110 tightens or slackens the safety belt assembly. More specifically, movement of the piston 130 in the first direction relative to the external cylinder 110 tightens or increases the tension within the safety belt assembly and movement of the piston 130 in the second direction relative to the external cylinder 110 loosens or decreases the tension within the safety belt assembly.

The gas generator 150 is attached to the external cylinder 110 and is configured to supply gas inside of the external cylinder 110 when the pretensioner 100 is operated. That is, when the pretensioner 100 is operated (e.g., prior to an impending impact), the gas generator 150 pressurizes the external cylinder 110 which causes the internal cylinder 120 and the piston 130 to move in the first direction relative to the external cylinder 110. Movement of the internal cylinder 120 and the piston 130 in the first direction increases tension within the retracting member 140 and removes the slack within the safety belt assembly.

To prevent injury to the passenger caused by excessive seat belt tension (i.e., caused by momentum of the passenger immediately after impact), the pretensioner 100 limits load or tension of the safety belt assembly. That is, the internal cylinder 120 and the piston 130 move in the second direction which decreases tension in the retracting member 140 and the safety belt assembly to reduce the force transferred to the passenger by the seat belt assembly. Movement of the internal cylinder 120 and the piston 130 in the second direction is limited by the external cylinder 110 such that the amount of decreased tension in the retracting member 140 is limited. That is, the external cylinder 110 is configured to limit the movement of the internal cylinder 120 and the piston 130 such that tension in the retracting member 140 remains but at a decreased magnitude.

Figure 2:
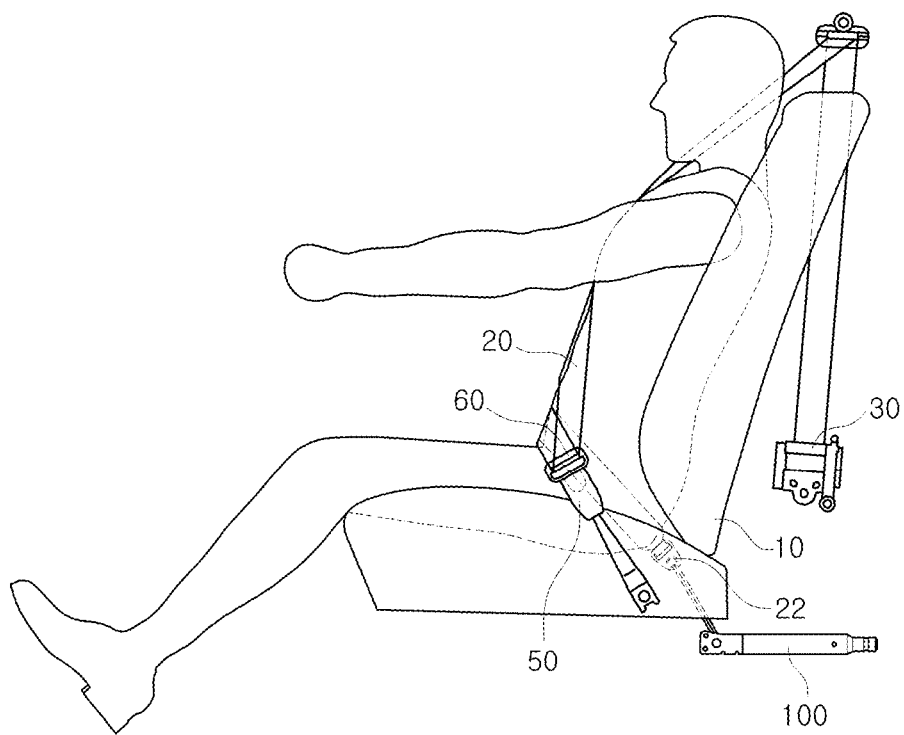

FIGS. 1 and 2 illustrate a safety belt assembly to which a pretensioner according to a first embodiment is applied.

Referring to FIG. 1, the safety belt assembly includes a belt 20 configured to fasten a passenger in a seat 10, a retractor 30 mounted on a vehicle and configured to roll or unroll one end of the belt 20, a fixing anchor 40 configured to fix the other end of the belt 20 to the vehicle, and a tongue plate 60 fastened to a buckle 50 provided opposite the fixing anchor 40 while being movably held at a middle portion of the belt 20.

Also, as shown in FIG. 1, the safety belt assembly may include a pretensioner 100 connected to the buckle 50 while being mounted on a structure below the seat 10 or a car body. The pretensioner 100 applies tension to the belt 20 by instantaneously pulling the buckle 50 at the beginning of a car crash to reduce slack of the belt 20, thereby performing a function of stably fastening the passenger to the seat 10.

The pretensioner 100 is not limited to being installed at the buckle 50 as the example shown in FIG. 1 and may be installed at an end portion 22 at the other side of the belt 20 by replacing the fixing anchor, as shown in FIG. 2. That is, the pretensioner 100 may support the end portion 22 of the belt 20 with being fixed to the structure below the seat 10 or the car body positioned opposite the buckle 50. In this case, the pretensioner 100 may reduce slack of the belt 20 by applying tension to the belt 20 by instantaneously rolling or pulling the belt 20 at a car crash.

The pretensioner 100 according to the first embodiment may include not only a function of applying tension by pulling the belt 20 at the beginning of the car crash but also a function of a load limiter configured to protect a body of the passenger by maintaining the tension of the belt 20 at or below a load limit when the tension of the belt 20 is rapidly increased. Below, a configuration and operation of the pretensioner 100 will be described.

Figure 3:
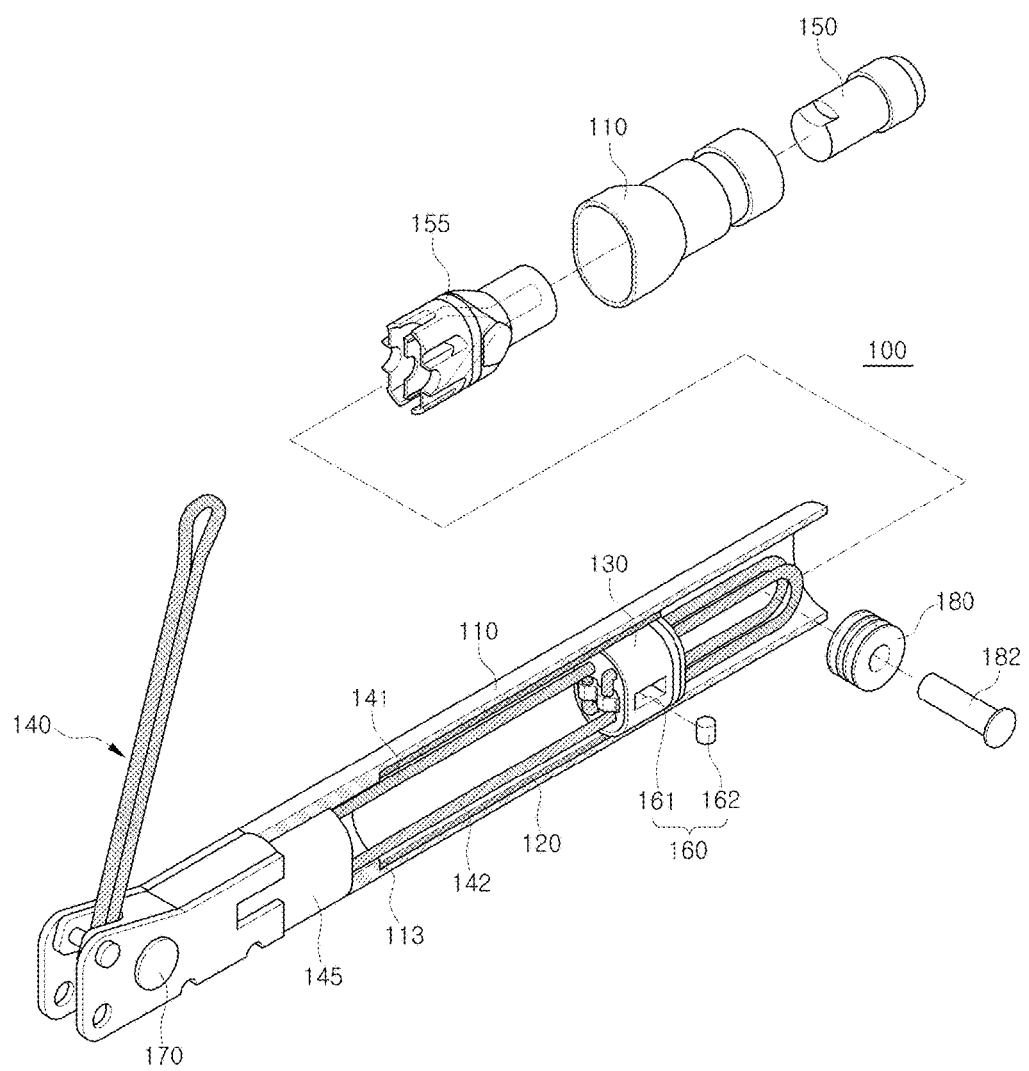
FIG. 3 is an exploded perspective view of the pretensioner according to the first embodiment.
Figure 4:
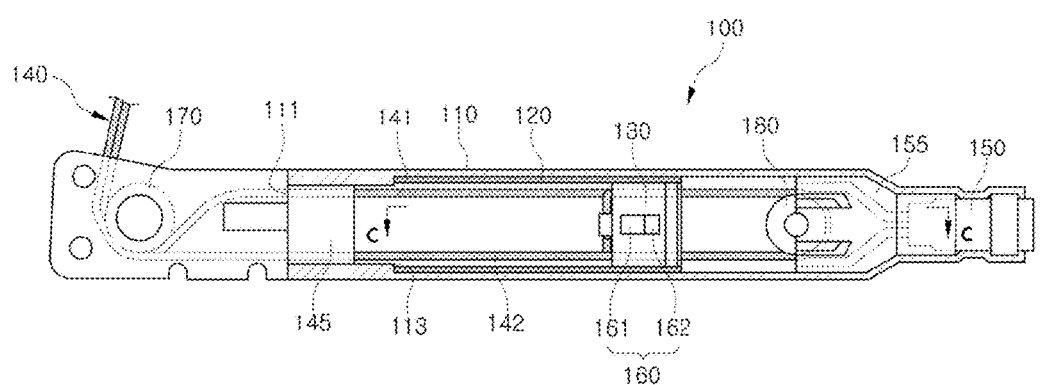
FIG. 4 is a cross-sectional perspective view of the pretensioner according to the first embodiment.

FIG. 3 is an exploded perspective view of the pretensioner according to the first embodiment, and FIG. 4 is a cross-sectional perspective view of the pretensioner according to the first embodiment. FIGS. 5 to 8 are cross-sectional views illustrating a portion taken along a line C-C of FIG. 4 and illustrate operation states of stages of the pretensioner.

Figure 5:
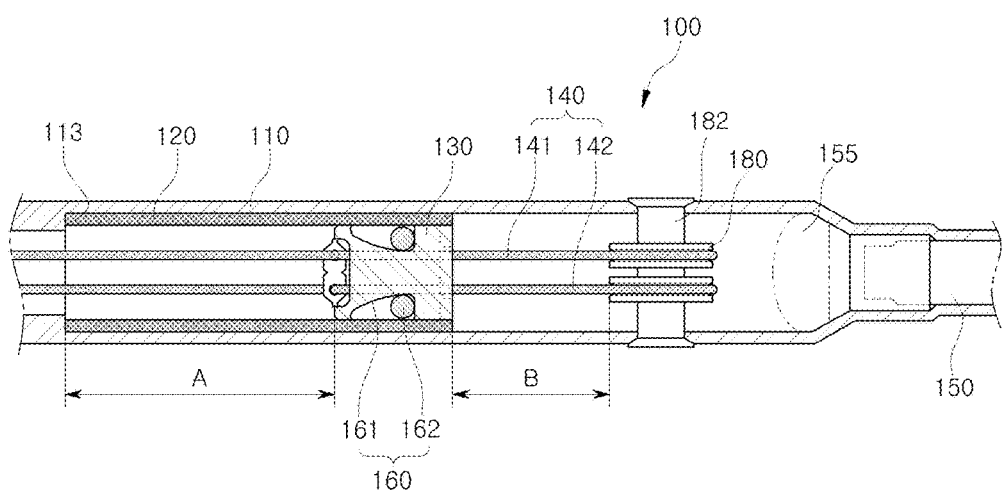
FIG. 5 is a cross-sectional view along a line C-C of FIG. 4 illustrating an initial position of a piston of the pretensioner before operation of a gas generator.

Referring to FIGS. 3 to 5, the pretensioner 100 according to the first embodiment includes an external cylinder 110 with a cross section in a circular or elliptical shape, an internal cylinder 120 installed to allow an outer surface thereof to be in close contact with an inner surface of the external cylinder 110 and movably installed in the external cylinder 110, a piston 130 installed in the internal cylinder 120, and a retracting member 140 with one side connected to the piston 130 and the other side configured to extend outside the external cylinder 110 and be connected to the end portion 22 of the belt 20 or the buckle 50 of the safety belt assembly.

Also, the pretensioner 100 includes a gas generator 150 configured to move the piston 130 in a direction of pulling the retracting member 140 by supplying gas to the inside of the external cylinder 110 and a one-way restriction device 160 provided at the piston 130 to allow only one-way movement of the piston 130 with respect to the internal cylinder 120.

The internal cylinder 120 has a cross section having the same shape as that of the external cylinder 110 and the outer surface thereof is pressed to fit an inner surface of the external cylinder 110 to maintain certain friction therebetween. The retracting member 140 may be formed of a bendable wire rope and the like.

As shown in FIG. 3, the pretensioner 100 according to the first embodiment includes an inlet 111 provided at one end portion of the external cylinder 110 to allow the retracting member 140 in a wire rope shape to move in and out, a guiding roller 170 installed at the inlet 111 to guide moving in and out of the retracting member 140, and an intermediate roller 180 installed inside the external cylinder 110 opposite the inlet 111.

Two strands 141 and 142 of the retracting member 140 move into the external cylinder 110 through the inlet 111, pass through the piston 130 to extend toward the intermediate roller 180 and to change direction by being wound around the intermediate roller 180, and then are connected to the piston 130. One strand 141 of the retracting member 140 may pass through the top of the piston 130, be wound around the intermediate roller 180, and then fixed to a bottom of the piston 130, and the other strand 142 of the retracting member 140 may pass through the bottom of the piston 130, be wound around the intermediate roller 180, and then be fixed to the top of the piston 130.

The retracting member 140 which extends outside the external cylinder 110 may be connected to the end portion 22 of the belt 20 or the buckle 50 of the safety belt assembly. A guiding member 145 configured to guide the retracting member 140 of the two strands 141 and 142 to move in without being mutually twisted may be installed in the external cylinder 110 at a position adjacent to the guiding roller 170.

In the pretensioner 100, since the retracting member 140 which moves into the external cylinder 110 is connected to the piston 130 with being wound around the intermediate roller 180 at an opposite side, while the piston 130 moves toward the inlet 111, the retracting member 140 outside the external cylinder 110 is pulled into the external cylinder 110.

The gas generator 150 is installed at the end portion of the external cylinder 110 opposite the inlet 111 and generates gas to pressurize the piston 130 toward the inlet 111. A gas guiding member 155 configured for dispersion and supplying of the gas generated by the gas generator 150 may be installed between the gas generator 150 and the intermediate roller 180 in the external cylinder 110.

As shown in FIG. 4, the gas generator 150 and the gas guiding member 155 may be fixed by a method in which the external cylinder 110 is contracted with the gas generator 150 accommodated in the end portion of the external cylinder 110. The intermediate roller 180 may be supported by fastening between the external cylinder 110 and a supporting pin 182 passing through the center thereof to be rotatable inside the external cylinder 110.

As shown in FIG. 5, the external cylinder 1 includes a holding step 113, at which one end of the internal cylinder 120 is held, on an inner surface adjacent to the inlet 111 to restrict movement of the internal cylinder 120 toward the inlet 111.

The internal cylinder 120 has a length provided to be shorter than the length between the holding step 113 and the intermediate roller 180 and initially maintains a state of having moved toward the inlet 111 to allow one end portion to be held at the holding step 113, as shown in FIG. 5. This is to allow the internal cylinder 120 to move with the piston 130 when the piston 130 is pulled toward the intermediate roller 180, by maintaining a gap between the internal cylinder 120 and the intermediate roller 180.

An initial position of the piston 130 is inside an end portion of the internal cylinder 120 adjacent to the intermediate roller 180 as in an example shown in FIG. 5. Accordingly, when pressure of internal space of the external cylinder 110 between the piston 130 and the intermediate roller 180 is increased by operation of the gas generator 150, the piston 130 may be pushed by the pressure and retract the retracting member 140 while moving toward the inlet 111 along the internal cylinder 120.

As shown in FIGS. 3 and 5, the one-way restriction device 160 includes one or more slanted grooves 161 formed at an outer surface of the piston 130 facing an inner surface of the internal cylinder 120 and configured to have depth gradually getting shallower in a movement direction of the piston 130 (toward the inlet 111) when retracting the retracting member 140 and a restricting member 162 having a ball or roller shape accommodated in each of the one or more slant grooves 161.

Figure 6:
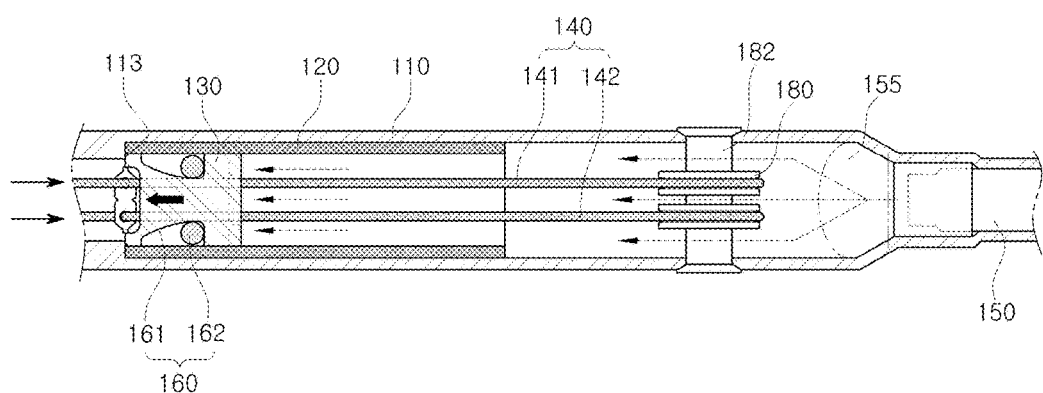
FIG. 6 is a cross-sectional view along a line C-C of FIG. 4 illustrating movement of the piston of the pretensioner after operation of the gas generator.

As shown in FIG. 6, since the restricting member 162 is positioned in a relatively large space in the slanted groove 161 when the piston 130 moves in a direction of pulling the retracting member 140 due to the operation of the gas generator, the one-way restriction device 160 allows the piston 130 to move with respect to the internal cylinder 120.

Figure 7:
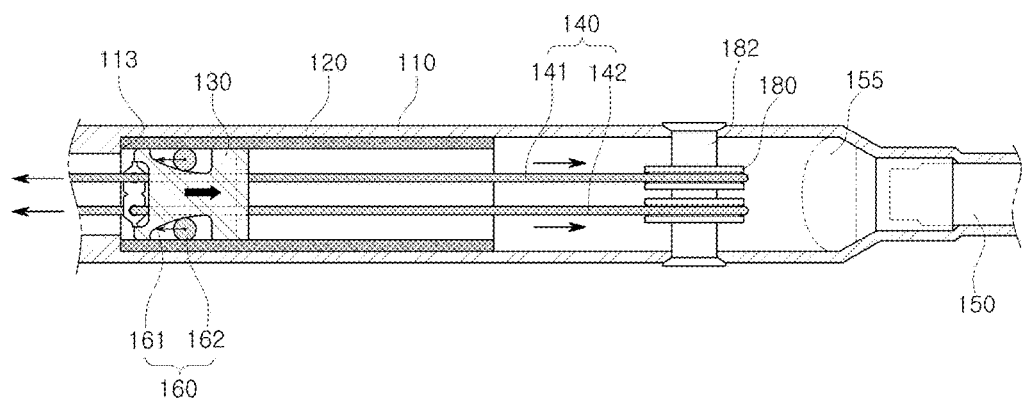
FIG. 7 is a cross-sectional view along a line C-C of FIG. 4 illustrating movement of the piston of the pretensioner due to a force applied by a passenger.

However, as shown in FIG. 7, when tension is applied to the belt 20 of the safety belt assembly and the piston 130 is to move in reverse direction, since the restricting member 162 moves to a relatively narrow space in the slant groove 161 and is inserted between the piston 130 and an inner wall of the internal cylinder 120, the piston 130 is restricted to be within the internal cylinder 120. When the piston 130 moves in reverse direction, movement of the piston 130 with respect to the internal cylinder 120 is limited.

Figure 8:
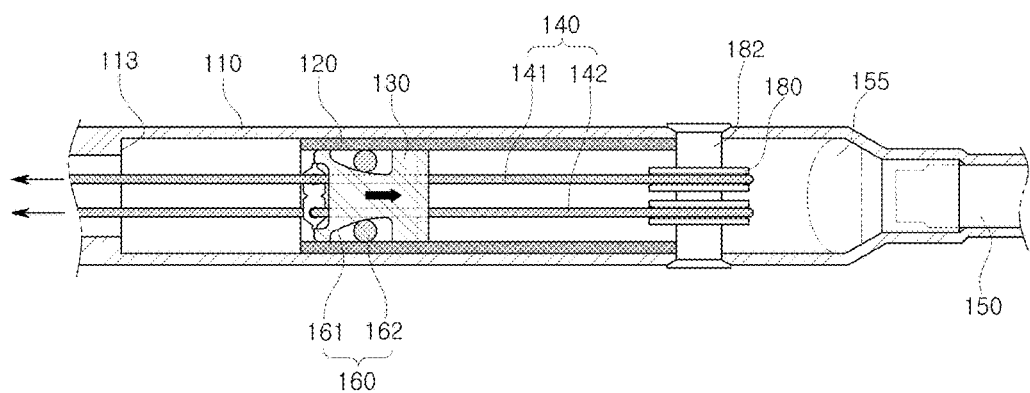
FIG. 8 is a cross-sectional view along a line C-C of FIG. 4 illustrating movement of the piston and an internal cylinder of the pretensioner due to the force applied by a passenger.

Accordingly, when the tension applied to the belt 20 reaches a preset load limit due to the operation of the pretensioner 100, as shown in FIG. 8, the piston 130 and the internal cylinder 120 move together in reverse direction, while the piston 130 is restricted at the internal cylinder 120. That is, the internal cylinder 120 overcomes frictional force acting between the inner surface of the external cylinder 110 and an outer surface of the internal cylinder 120 and moves in reverse direction. Accordingly, the pretensioner 100 may perform a function of a load limiter to maintain tension of the belt 20 to be at or below a preset load limit. For such operation, the frictional force between the outer surface of the internal cylinder 120 and the inner surface of the external cylinder 110 is set to be the load limit of the belt 20 or less.

In FIG. 5, a distance A between one end portion of the piston 130 and the holding step 113 is a maximum movement distance of the piston 130 while pulling the retracting member 140 due to the operation of the gas generator 150. Also, a distance B between the other end portion of the piston 130 and the intermediate roller 180 is a maximum movement distance of the piston 130 and the internal cylinder 120 in reverse direction due to the tension of the belt 20 when the tension of the belt 20 reaches the load limit. That is, the distance B is a maximally withdrawn distance of the retracting member 140 for loosening the belt 20. Accordingly, the pretensioner 100 may properly adjust operation of the piston 130 for pulling the retracting member 140 and operation of the internal cylinder 120 for moving in reverse direction (a function of a load limiter) by setting the distances A and B.

Next, the operation of the pretensioner according to the first embodiment will be described with reference to FIGS. 5 to 9.

Figure 9:
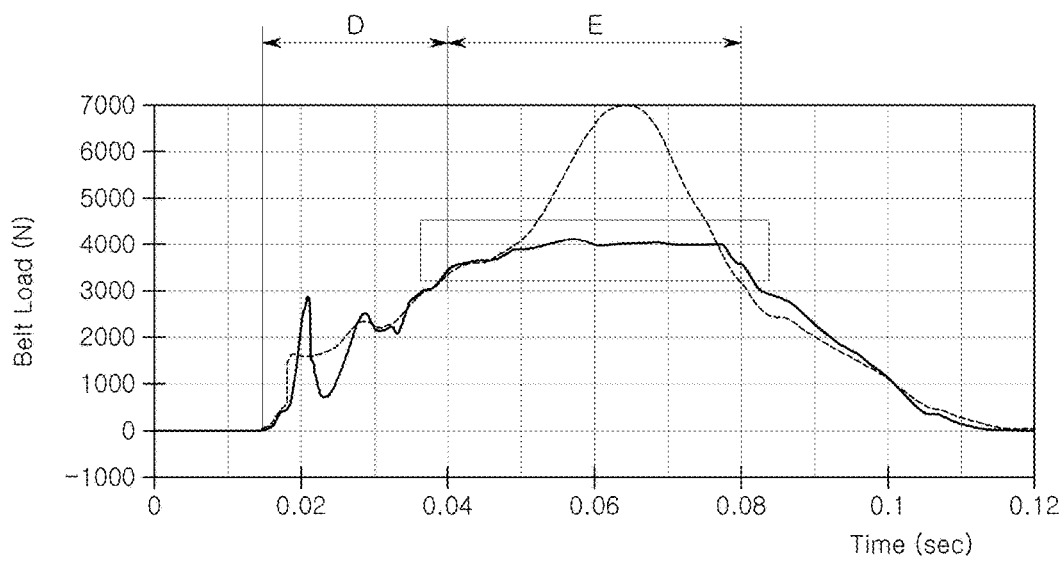
FIG. 9 is a graph comparing development of change in tension applied to a belt in a general pretensioner without an internal cylinder and development of change in tension applied to a pretensioner operating with an internal cylinder as in the first embodiment.

FIG. 5 illustrates a state in which the piston 130 is disposed at the initial position before the pretensioner 100 operates, FIG. 6 illustrates a state in which the piston 130 moves toward the inlet 111 due to the operation of the gas generator 150 and retracts the retracting member 140, FIG. 7 illustrates a state in which the piston 130 is to move in reverse direction for pulling the belt 20 due to force of a passenger and is restricted at the internal cylinder 120, and FIG. 8 illustrates a state in which the piston 130 and the internal cylinder 120 move in reverse direction due to the tension of the belt 20 when force at the load limit or greater is applied to the belt 20. Also, FIG. 9 is a graph comparing development of change in tension applied to the belt 20 in a conventional pretensioner without an internal cylinder and development of change in tension applied to the pretensioner 100 with the internal cylinder 120 as in the first embodiment.

In an initial state before the pretensioner 100 operates, as shown in FIG. 5, the internal cylinder 120 maintains a state of having moved toward the inlet 111 of the external cylinder 110, and the piston 130 is positioned at the end portion of the internal cylinder 120 adjacent to the intermediate roller 180.

When a car crash or the like occurs in the state shown in FIG. 5, the gas generator 150 ejects gas and the pretensioner 100 operates. Here, as shown in FIG. 6, the piston 130 instantaneously pulls the retracting member 140 while moving toward the inlet 111 along the inner surface of the internal cylinder 120 due to a pressure of the gas supplied to the inside of the external cylinder 110. Accordingly, the pretensioner 100 may fasten the body of a passenger to the seat 10 by pulling the belt 20 at the beginning of a car crash, thereby preventing the body of the passenger from moving forward.

After the piston 130 retracts the retracting member 140 while moving toward the inlet 111, the piston 130 is to move in reverse direction due to force of the passenger for pulling the belt 20. However, here, as shown in FIG. 7, since the piston 130 is restricted at the inner surface of the internal cylinder 120 due to the operation of the one-way restriction device 160, the piston 130 does not move in reverse direction. Accordingly, when the tension of the belt 20 is at or below the load limit, the belt 20 may be maintained in a state of tightening the passenger.

When the pretensioner 100 operates, the tension applied to the belt 20 may instantaneously increase to be at a preset load limit or more. In this case, as shown in FIG. 8, the piston 130 and the internal cylinder 120 reversely move (toward the intermediate roller 180 due to the tension of the belt 20 to maintain the tension of the belt 20 to be at the load limit or less. When the tension of the belt 20 reaches the load limit, the function of the load limiter for losing the tension of the belt 20 is performed.

In the graph of FIG. 9, a broken line indicates development of change in tension applied to a belt of a safety belt assembly while a general pretensioner without the internal cylinder 120 operates. Also, a solid line indicates development of change in tension applied to the belt 20 of the safety belt assembly when the pretensioner 100 with the internal cylinder 120 according to the first embodiment operates.

As shown in FIG. 9, in a D section in which the piston 130 pulls the retracting member 140 through the operation of the gas generator 150, tension of the belt for both the general pretensioner and the pretensioner according to the present disclosure increases. After that, in an E section, the tension of the belt of the general pretensioner (the broken line) may increase to a load limit or more due to force of a passenger pulling the belt. On the other hand, in the case of the pretensioner according to the first embodiment (the solid line), since the internal cylinder 120 performs as a load limiter while moving in reverse direction with the piston 130, the tension of the belt 20 may be maintained at or below a load limit. Accordingly, the body of the passenger may be protected by preventing the tension of the belt 20 from excessively increasing.

Figure 10:
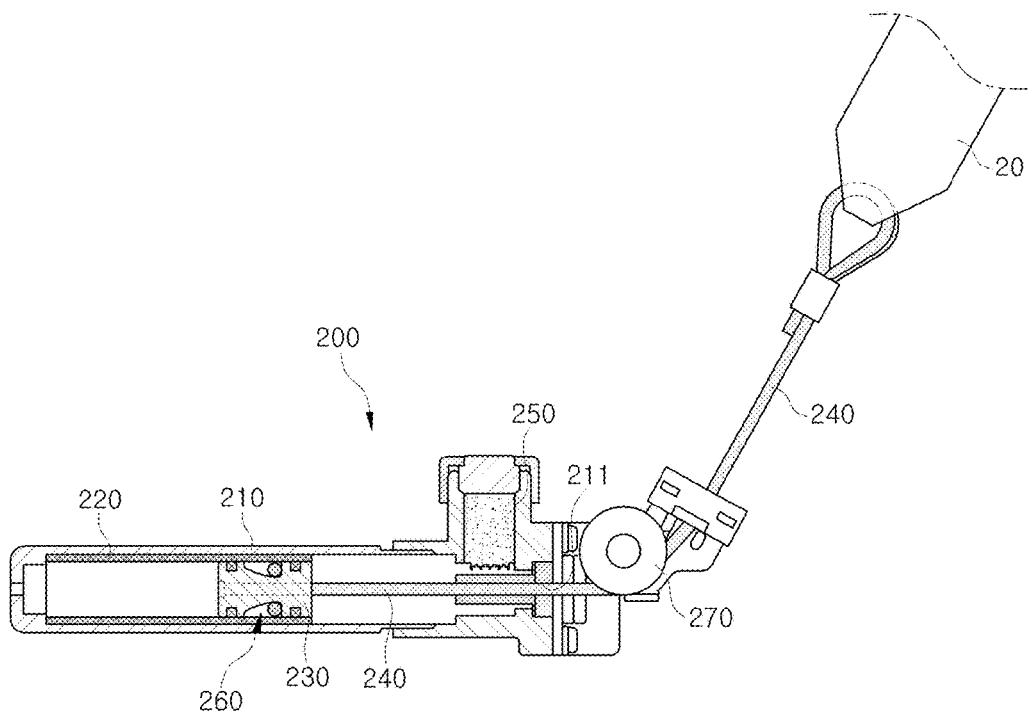
FIG. 10 is a cross-sectional view of a pretensioner according to a second embodiment.

FIG. 10 is a cross-sectional view of a pretensioner according to a second embodiment.

Referring to FIG. 10, a pretensioner 200 according to the second embodiment includes an external cylinder 210, an internal cylinder 220 movably installed in the external cylinder 210 with an outer surface thereof in close contact with an inner surface of the external cylinder 210, a piston 230 installed in the internal cylinder 220, and a retracting member 240 with one side connected to the piston 230 and the other side configured to extend from the external cylinder 210 and be connected to the belt 20 for fastening the passenger or a buckle. Also, the pretensioner 200 includes a gas generator 250 configured to supply gas to the inside of the external cylinder 210 to move the piston 230 in a direction of pulling the retracting member 240 and a one-way restriction device 260 configured to allow the piston 230 to move with respect to the internal cylinder 220 when the piston 230 moves in a direction of pulling the retracting member 240 and to fasten the piston 230 to the internal cylinder 220 when the piston 230 moves in reverse direction.

Like the first embodiment, the retracting member 240 may be formed of a bendable wire rope and the like and may move in and out through an inlet 211 provided at one end portion of the external cylinder 210. Unlike the first embodiment, the gas generator 250 may be installed at the inlet 211 of the external cylinder 210.

The internal cylinder 220 may have a length shorter than a length of the external cylinder 210 and may maintain a state of having moved toward the end portion of the external cylinder 210 opposite the inlet 211 in an initial state. Also, the piston 230 is positioned inside an end portion of the internal cylinder 220 adjacent to the inlet 211 at the initial state. The one-way restriction device 260 may be configured as in the first embodiment.

In the pretensioner 200 according to the second embodiment, the gas is supplied to the inside of the external cylinder 210 due to the operation of the gas generator 250 disposed at the inlet 211, and the piston 230 may increase tension of the belt 20 by pulling the retracting member 240 while moving to be farther from the inlet 211 due to a pressure of the gas. In FIG. 10, reference numeral 270 refers to a guiding roller configured to guide the retracting member 240.

Figure 11:
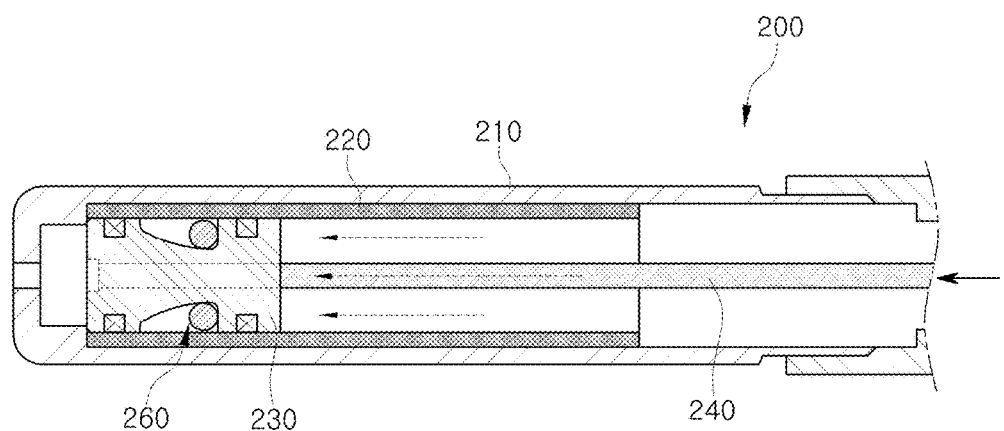
FIG. 11 is a cross-sectional view of the pretensioner according to the second embodiment movement of a piston of the pretensioner after operation of a gas generator.
Figure 12:
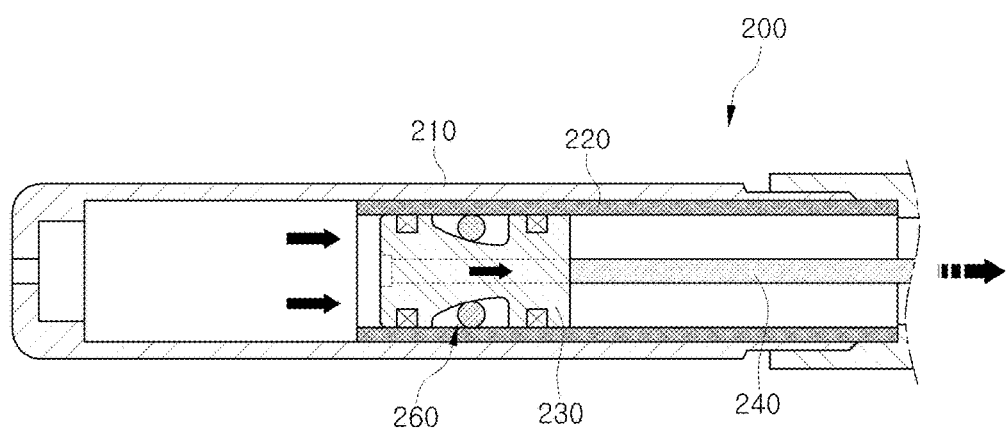
FIG. 12 is a cross-sectional view of the pretensioner according to the second embodiment illustrating movement of the piston and an internal cylinder of the pretensioner due to the force applied by a passenger.

Below, the operation of the pretensioner according to the second embodiment will be described with reference to FIGS. 11 to 12. FIGS. 11 and 12 are cross-sectional views of the pretensioner according to the second embodiment, each illustrating an operation state for each stage of the pretensioner.

FIG. 11 illustrates a state in which the piston 230 retracts the retracting member 240 while moving toward an opposite side of the inlet 211 due to the operation of the gas generator 250. Here, the piston 230 instantaneously pulls the retracting member 240 while moving toward the opposite side of the inlet 211 along an inner surface of the internal cylinder 220 due to the pressure of the gas supplied from the gas generator 250. Accordingly, the pretensioner 200 may fasten the body of a passenger to the seat 10 by pulling the belt 20 at the beginning of a car crash, thereby preventing the body of the passenger from moving forward.

FIG. 12 illustrates a state in which the piston 230 and the internal cylinder 220 move in reverse direction (toward the inlet) due to the tension of the belt 20 when force at a load limit or more is applied. Here, since the piston 230 is restricted at the inner surface of the internal cylinder 220 due to the operation of the one-way restriction device 260, the piston 230 and the internal cylinder 220 maintain the tension of the belt 20 to be at or below the load limit while moving in reverse direction (toward the inlet) due to the tension of the belt 20. That is, the pretensioner 200 performs the function of the load limiter.

As is apparent from the above description, a pretensioner in accordance with one embodiment of the present disclosure may not only perform a function of increasing tension of a belt by pulling a retracting member but also may perform a function of a load limiter for maintaining the tension of the belt at or below a load limit, with an internal cylinder moving with a piston due to the tension of the belt when the tension applied to the belt reaches the load limit.

Although a few embodiments of the present disclosure have been shown and described, it would be appreciated by those skilled in the art that changes may be made in these embodiments without departing from the principles and spirit of the present disclosure, the scope of which is defined in the claims and their equivalents.

What is claimed is:

1. A pretensioner comprising:
    an external cylinder;
    an internal cylinder movably installed in the external cylinder while an outer surface thereof is in close contact with an inner surface of the external cylinder;
    a piston installed in the internal cylinder;
    a retracting member configured with one side connected to the piston and the other side configured to extend from the external cylinder and be connected to a belt fastening a passenger;
    a gas generator configured to supply gas to the inside of the external cylinder to move the piston in a direction of pulling the retracting member; and
    a one-way restriction device configured to allow the piston to move with respect to the internal cylinder when the piston moves in the direction of pulling the retracting member and to restrict the piston to be within the internal cylinder when the piston moves in reverse direction.

2. The pretensioner of claim 1, wherein frictional force between the outer surface of the internal cylinder and the inner surface of the external cylinder is set to be at or below a load limit of the belt.

3. The pretensioner of claim 2, wherein the retracting member is in a bendable rope shape.

4. The pretensioner of claim 3, further comprising:
    an inlet provided at one end portion of the external cylinder to allow the retracting member to move in and out therethrough;
    a guiding roller installed at the inlet and configured to guide inward movement and outward movement of the retracting member; and
    an intermediate roller installed in the external cylinder opposite the inlet,
    wherein the retracting member moves into the external cylinder, passes through the piston, extends toward the intermediate roller, changes direction by being wound around the intermediate roller, and is connected to the piston.

5. The pretensioner of claim 4, wherein the gas generator is installed at an end portion of the external cylinder opposite the inlet and generates gas to pressurize the piston toward the inlet.

6. The pretensioner of claim 4, wherein the external cylinder comprises a holding step having an inner surface adjacent to the inlet, at which one end portion of the internal cylinder is held, and
    wherein the internal cylinder has a length shorter than the length between the holding step and the intermediate roller and initially maintains a state of having moved toward the inlet.

7. The pretensioner of claim 6, wherein an initial position of the piston is inside the end portion of the internal cylinder adjacent to the intermediate roller.

8. The pretensioner of claim 3, wherein the retracting member moves in and out through an inlet provided at one end of the external cylinder, and
    wherein the gas generator is installed at the inlet of the external cylinder.

9. The pretensioner of claim 8, wherein the internal cylinder is provided to have a length shorter than the length of the external cylinder and maintains a state of having moved toward the end portion of the external cylinder, and wherein the piston is initially disposed inside an end portion of the internal cylinder adjacent to the inlet.

10. The pretensioner of claim 1, wherein the one-way restriction device comprises:
one or more slanted grooves formed at an outer surface of the piston facing an inner surface of the internal cylinder and having a depth configured to gradually become shallower in a direction in which the piston moves; and
a restricting member accommodated in each of the one or more slanted grooves.

11. A safety belt assembly comprising a pretensioner comprising an external cylinder, an internal cylinder movably installed in the external cylinder with an outer surface thereof in close contact with an inner surface of the external cylinder, a piston installed in the internal cylinder, a retracting member configured to be with one side connected to the piston and the other side configured to extend from the external cylinder and be connected to a belt fastening a passenger, a gas generator configured to supply gas to the inside of the external cylinder to move the piston in a direction of pulling the retracting member, and a one-way restriction device configured to allow the piston to move with respect to the internal cylinder when the piston moves in the direction of pulling the retracting member and to restrict the piston to be within the internal cylinder when the piston moves in reverse direction.

* * * * *